Jan. 31, 1967 E. G. GROCHOWSKI ETAL 3,301,213
EPITAXIAL REACTOR APPARATUS
Filed Oct. 23, 1962

INVENTORS
EDWARD G. GROCHOWSKI
MICHELE RANALDI
ROBERT S. SCHWARTZ
WILLIAM H. WHITE
BY Bertram M. Mullin
ATTORNEY United States Patent Office 3,301,213
Patented Jan. 31, 1967

3,301,213
EPITAXIAL REACTOR APPARATUS
Edward G. Grochowski, Michele Ranaldi, Robert S. Schwartz, and William H. White, Poughkeepsie, N.Y., assignors to International Business Machines Corporation, New York, N.Y., a corporation of New York
Filed Oct. 23, 1962, Ser. No. 232,456
1 Claim. (Cl. 118—48)

This invention relates to epitaxial thin films, and, in particular, to the apparatus and method for epitaxially growing thin films on semiconductor materials.

Epitaxial growth of crystal layers and of semiconductors involves the reduction or disproportionation reaction of a gaseous halide at an elevated temperature on a substrate positioned in a suitable reactor. With the reactors presently available in the art, it is not possible to expose more than one or two substrates at one given time to the gaseous stream without sacrificing uniformity of the electronic characteristics of the semiconductor devices thus produced. Efforts made in the art to overcome this deficiency have been unsuccessful thus far, due to the uneven reactant concentration and temperature gradients which are inherently developed during the growth process in known type of reactors. It has been the object of considerable research, therefore, to find a technique in which it is possible to grow films epitaxially on a number of substrates in a single operation and produce usable films having uniform electronic qualities.

The present invention is based upon the discovery of a technique whereby an epitaxial growth operation is conducted under unique environmental conditions of heat application and gaseous disproportionation or reduction to provide a reaction zone characterized by a constant temperature profile and a constant profile of gaseous reactants thereby enabling the epitaxial growth of thin films to be conducted simultaneously on a large number of semiconductor substrates in a single operation and in such fashion as to yield a batch of products having uniform electronic characteristics.

It is a broad object of the invention to provide an improved technique for growing epitaxial films of uniform electronic characteristics on a number of semiconductor substrates in a single operation.

More specifically, it is an object of the invention to provide an improved reactor apparatus for producing epitaxial films of uniform electronic characteristics on a number of semiconductor substrates in a single operation.

It is a related object of this invention to provide a commercially feasible means for manufacturing in a single operation a number of semiconductor substrates with epitaxial films of uniform electronic characteristics.

The foregoing and other objects, features and advantages of this invention will be apparent from the following more particular description of a preferred embodiment of the invention as illustrated in the accompanying drawings.

For a fuller understanding of the nature and objects of the invention, reference should be had to the following detailed description taken in combination with the accompanying drawings, in which.

Figures 1, 2:
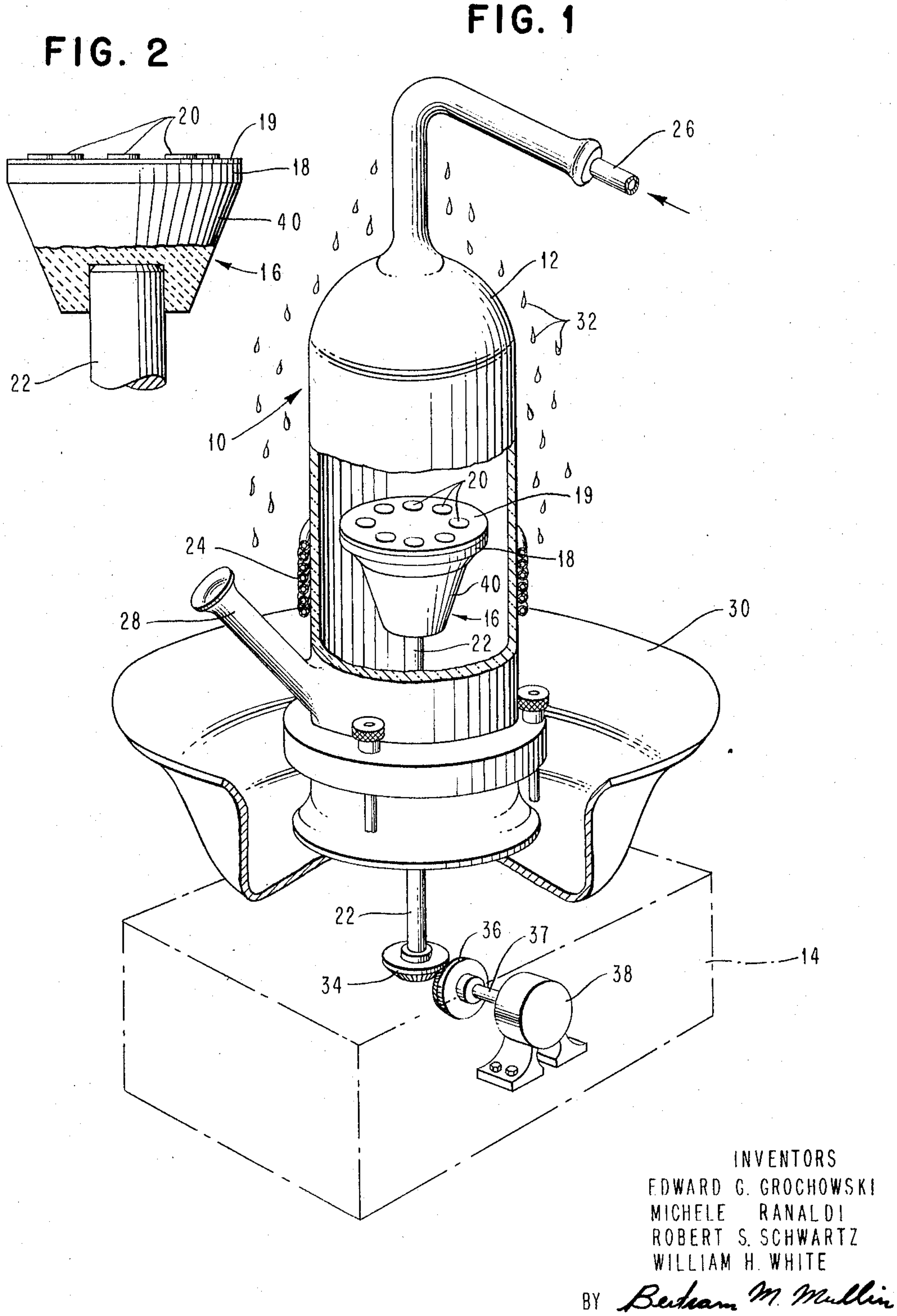
FIGURE 1 is a schematic representation of a preferred embodiment of the invention.
FIGURE 2 is a view partially in section of a preferred embodiment of a support used in the apparatus of FIGURE 1 to provide a profile of constant temperature over a substrate-bearing surface of the support.

With reference to FIGURE 1 of the drawing, an epitaxial reactor apparatus 10 constructed in accordance with the invention comprises, in general, an upright chamber 12 vertically mounted on a base 14, an upright support 16, preferably of graphite, having a horizontal planar face 18 bearing a protective disk or shield 19 for carrying a batch of semiconductor substrates 20, said support being rotatably mounted on a vertical shaft 22 within chamber 12, and a high-frequency induction coil 24 circumferentially positioned on the outside surface of the chamber 12 around the lower portion of the support 16. The particular materials of which the substrates 20 and shield 19 may be made will be described hereinafter.

At the top of chamber 12, inlet 26 is provided for introducing the gaseous mixture which is to promote the growth of the epitaxial films on the substrates 20. Outlet 28 is provided at the bottom of chamber 12 through which the gaseous reactant products are withdrawn. Reservoir 30 is provided above the base 14 to collect the water spray 32 which is used for cooling the outside of the chamber 12.

As seen in FIGURE 1, shaft 22 on which the support 16 is mounted carries a bevel gear 34 which meshes with a bevel gear 36 on the drive shaft 37 of a motor 38 or other suitable drive means. It is important that the shaft 22 rotate at a constant rate and there be no eccentricities in the support 16, since a nonuniform rotation would tend to adversely affect the nature of the gas flow over the substrates, possibly causing inhomogeneities in the films produced thereon.

The configuration of the support 16 below the planar top surface 18 on which the substrates 20 are carried is of great importance insofar as the practice of the present invention is concerned. In general, it is desired that the cross-sectional area of the support progressively decrease from its upper end toward the lower end thereof, the purpose of this being explained presently. In the embodiment shown in FIGURE 1 and FIGURE 2, for example, the lower portion or base section 40 of the support 16 has a conical or frusto-conical shape, with the smaller end thereof at the bottom where it is remote from the planar upper surface 18 on which the substrates 20 are supported. Where the support 16 is made of graphite, a quartz disk or shield 19 is placed between the substrates 20 and the face 18 to protect the substrates from contamination. The heat generated within the support 16 by the inductor coil 24 tends to concentrate toward the lower end of the base 40 remote from the supporting surface 18, due to the smaller cross section at that point. This concentrated heat gradually is distributed upwardly by conduction through the base section 40 of the support 16 until it provides a uniform temperature over the planar face 18. The tapered configuration of the base section 40, with the smallest end thereof remote from the substrate-bearing face 18 within the heating front of the coil 24, has been found essential to the achievement of a uniform temperature distribution over the face 18.

Although the base section 40 has been illustrated as having a conical exterior, it may be possible to provide a base structure which is tapered in some other fashion to achieve the same result. The principal requirement is that the heat generated by induction shall be concentrated in a part of the structure which is not adjacent to the supporting surface thereof so that the supporting surface receives its heat by conduction through substantially the entire body of the material in the base section of the support, thereby allowing adequate opportunity for the heat to distribute itself uniformly over the supporting surface and thereby provide a constant temperature profile.

As mentioned above and here restated for emphasis, the particular shape of the support is most critical to the ultimate control of the electronic quality of the semiconductor films produced by this apparatus. Since the reaction rate, that is the epitaxial deposition rate, is strongly influenced by the substrate temperature, it is essential that the planar face of the support carrying the batch of semiconductor substrates be at a uniform temperature. With a support that diminishes in cross section toward a point in the induction heating field remote from the planar face of the support, the heat tends to be distributed uniformly as it progresses upwardly through the tapered base, thus maintaining the planar face at a uniform temperature. With a support lacking the required tapered base portion, temperature gradients develop over the substrate-supporting surface. As a result, substrates on some portions of the support surface may be exposed to lower temperatures than substrates on other portions thereof, and those at the lower temperatures react more slowly than those at the higher temperatures, thereby developing thinner films with varying resistivities. With a support a planar face and tapered base section as heretofore defined in accordance with the present invention, these difficulties are obviated, and epitaxial films of uniform electronic characteristics are grown on a batch of semiconductor substrates in a single operation.

In order to establish a proper perspective and to provide a starting place for one skilled in the art in practicing the invention, the following set of specifications of epitaxially depositing films in the reactor system in accordance with the invention are provided, it being understood that no limitations should be construed thereby since the provisions of these specifications are made merely as a guide and it will be readily apparent to one skilled in the art that a wide variety of such specifications may be employed within the spirit of the invention.

In the use of the illustrated apparatus, a batch of substrates such as silicon substrates one inch in diameter and approximately 6 mils in thickness are positioned on the planar face of the support. Prior to being positioned there, the substrates are etched and cleaned by procedures well known in the art. After the interior of the chamber 12 is evacuated, by means not shown, and the customary leak detection procedures are completed, hydrogen is admitted into the chamber by way of inlet 26 at a rate of about 10 liters per minute. Following this, a cooling spray 32 is continuously directed onto the outside of the chamber 12.

Once the planar face 18 has reached the required uniform temperature, the gaseous reactant mixture is introduced along with hydrogen into the chamber 12 through the inlet 26. With silicon substrates, the active gaseous agent may be silicon tetrachloride, and the resistivities of the resulting films controlled as desired by adding small amount of impurities, such as phosphorus trichloride for N-type films and boron tribromide for P-type films, to the reaction mixture.

Of primary importance in the reaction is the deposition temperature. There is a minimum temperature and a maximum temperature between which single crystal epitaxial films may be grown on silicon substrates. The minimum temperature is about 1000° C., and the maximum temperature is about 1200° C., with the optimum temperature being about 1130° C. At this optimum temperature, best results are obtained. No imperfections, pits or flaws are observed which are noted at higher temperatures, nor are any irregular growth patterns detected such as usually occur with low-temperature deposition. The speed at which the support rotates in the gaseous flow also is important. At very low speeds or with no rotation, large variations in film thicknesses and resistivities result. At higher rates of rotation the substrates tend to move during rotation. With a gaseous flow of about 10 liters per minute, the optimum rotation rate is about 12 r.p.m. The rotation rate should be selected in accordance with the gaseous flow rate in order that the substrates on the support will be exposed to a uniform and a constant profile of gaseous reactants.

The term "profile" as employed herein is intended to denote the manner in which a particular environmental agency or condition is distributed over a given area or surface, which in this instance comprises the planar surface 18 supporting the substrates 20.

As to the dimensions and materials utilized in constructing the epitaxial reactor system in accordance with the invention, reactor chamber 12 may be a quartz tube of about 106 millimeters in diameter, the support 16 may be a graphite body 3¼ inches in diameter at its large upper end, the shaft 22 a quartz tube about 1 inch in diameter and the power for induction coil 24 supplied from a generator of about 20 kw. capacity. With this particular arrangement, about 8 substrates are treated at one time.

What has been described hereinabove is a technique for epitaxially growing thin films on a relatively large batch of semiconductor substrates and producing these films with uniform electronic characteristics. This makes it possible to produce semiconductor devices, such as transistors and diodes, in large quantities with identical electronic properties. The present invention greatly facilitates the regulation of film thicknesses, resistivities and other electronic characteristics, and provides manufacturing techniques that are susceptible to extremely accurate control. The feature which makes this possible is the use of the above-described tapered rotating support, which is adapted to provide a uniform temperature along the substrate-bearing surface of the support while rotating said surface in accordance with the velocity of the impinging gaseous mixture to provide the substrates with a constant profile of gaseous reactants.

While there have been shown and described and pointed out the fundamental novel features of the invention as applied to the preferred embodiments thereof, it will be understood that various omissions and substitutions and changes in the form and details of the device as illustrated and in its operation may be made by those skilled in the art without departing from the spirit of the invention.

What is claimed is:

An apparatus for epitaxially growing films on a plurality of semiconductor substrates, comprising the combination of:

a chamber, an upright solid frusto-conical support rotatably mounted within such chamber, said solid frusto-conical support having a horizontal planar face for bearing a plurality of semiconductor substrates, an inlet in the upper portion of said chamber and above said planar face for injecting a stream of gaseous reactants upon said planar face, means for inductively heating said support, said means being around said chamber circumferentially about said planar face and being positioned to inductively couple said support below said planar face; and, means for rotating said support in accordance with velocity of said gaseous stream to provide said planar face with a constant profile of gaseous reactants.

References Cited by the Examiner

UNITED STATES PATENTS

| | | | |
|---|---|---|---|
| 2,532,971 | 12/1950 | VanLeer et al. | 117—107.1 |
| 2,823,102 | 2/1958 | Selker et al. | 23—223.5 X |
| 2,877,138 | 3/1959 | Vodonik | 117—93 |
| 3,014,791 | 12/1961 | Benzing et al. | 23—223.5 X |
| 3,023,727 | 3/1962 | Theodoseau et al. | 117—38 X |
| 3,078,150 | 2/1963 | Raymond | 23—223.5 |
| 3,095,279 | 6/1963 | Wegener | 23—223.5 X |
| 3,233,578 | 2/1966 | Capita | 118.49.1 |

FOREIGN PATENTS

| | | |
|---|---|---|
| 362,020 | 12/1931 | Great Britain. |

ALFRED L. LEAVITT, *Primary Examiner.*

A. GOLIAN, *Assistant Examiner.*